US012156211B2

(12) United States Patent
Mallick et al.

(10) Patent No.: US 12,156,211 B2
(45) Date of Patent: Nov. 26, 2024

(54) SIDELINK FEEDBACK REQUEST DETERMINATION

(71) Applicant: LENOVO (BEIJING) LIMITED, Beijing (CN)

(72) Inventors: Prateek Basu Mallick, Dreieich (DE); Xiaodong Yu, Beijing (CN); Karthikeyan Ganesan, Nauheim (DE); Joachim Loehr, Wiesbaden (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 516 days.

(21) Appl. No.: 17/280,102

(22) PCT Filed: Feb. 12, 2019

(86) PCT No.: PCT/CN2019/074845
§ 371 (c)(1),
(2) Date: Mar. 25, 2021

(87) PCT Pub. No.: WO2020/163990
PCT Pub. Date: Aug. 20, 2020

(65) Prior Publication Data
US 2021/0345313 A1    Nov. 4, 2021

(51) Int. Cl.
*H04W 72/20* (2023.01)
*H04W 72/0446* (2023.01)
*H04W 72/0453* (2023.01)

(52) U.S. Cl.
CPC ....... *H04W 72/20* (2023.01); *H04W 72/0446* (2013.01); *H04W 72/0453* (2013.01)

(58) Field of Classification Search
CPC ............. H04W 72/20; H04W 72/0446; H04W 72/0453
See application file for complete search history.

(56) References Cited

U.S. PATENT DOCUMENTS

2020/0137536 A1* 4/2020 Nguyen ............... H04L 27/2607
2020/0235868 A1* 7/2020 Yu .......................... H04W 76/28
(Continued)

FOREIGN PATENT DOCUMENTS

| CN | 105075367 A | 11/2015 |
| WO | 2018166607 A1 | 9/2018 |
| WO | 2018168169 A1 | 9/2018 |

OTHER PUBLICATIONS

International Searching Authority, "Notification of Transmittal of the International Search Report and the Written Opinion of the International Searching Authority, or the Declaration", PCT/CN2019/074845, Feb. 12, 2019, pp. 1-6.
(Continued)

*Primary Examiner* — Jackie Zuniga Abad
(74) *Attorney, Agent, or Firm* — Kunzler Bean & Adamson

(57) ABSTRACT

Apparatuses, methods, and systems are disclosed for feedback request determination. One method (1100) includes determining (1102), at a first sidelink device, whether to request feedback corresponding to communications with a second sidelink device. The method (1100) includes, in response to determining to request feedback corresponding to the communications with the second sidelink device, transmitting (1104) first information to the second sidelink device indicating a request for feedback. The method (1100) includes transmitting (1106) second information to the second sidelink device indicating resources for communicating the feedback.

17 Claims, 8 Drawing Sheets

(56) References Cited

U.S. PATENT DOCUMENTS

2021/0168574 A1* 6/2021 Zhang ................ H04W 8/005
2021/0250131 A1* 8/2021 Fan ..................... H04L 5/003
2021/0377912 A1* 12/2021 El Hamss ........... H04L 1/1854

OTHER PUBLICATIONS

3GPP, 3rd Generation Partnership Project; Technical Specification Group Radio Access Network; Physical layer procedure for NR-V2X, 3GPP R1-1812811, Nov. 2018, pp. 1-5.
Fraunhofer HHI, Fraunhofer IIS, Physical Layer Procedures for Unicast and Groupcast, 3GPP TSG RAN WG1 Meeting AH-1901, R1-1900355, Jan. 21-25, 2018, pp. 1-7, Taipei, Taiwan.
Intel Corporation, Sidelink physical layer procedures for NR V2X communication, 3GPP TSG RAN WG1 Ad-Hoc Meeting 1901, R1-1900481, Jan. 21-25, 2019, pp. 1-17, Taipei, Taiwan.

* cited by examiner

PSFCH
818

| 1004 | 1010 |
| 1002 | 1008 |
| 1000 | 1006 |

FIG. 10

SIDELINK FEEDBACK REQUEST DETERMINATION

FIELD

The subject matter disclosed herein relates generally to wireless communications and more particularly relates to feedback request determination.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Broadcast ("BC"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Component Carrier ("CC"), Code Division Multiplexing ("CDM"), Control Element ("CE"), Coordinated Multipoint ("CoMP"), Categories of Requirements ("CoR"), Control Plane ("CP"), CSI-RS Resource Indicator ("CRI"), Cell RNTI ("C-RNTI"), Channel State Information ("CSI"), Channel Quality Indicator ("CQI"), Central Unit ("CU"), Codeword ("CW"), Downlink ("DL"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Guaranteed Bit Rate ("GBR"), Groupcast ("GC"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Group ("LCG"), Logical Channel ID ("LCID"), Logical Channel Prioritization ("LCP"), Least Significant Bit ("LSB"), Long Term Evolution ("LTE"), Levels of Automation ("LoA"), Medium Access Control ("MAC"), Modulation Coding Scheme ("MCS"), Multiple Input Multiple Output ("MIMO"), Most Significant Bit ("MSB"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), One-to-Many Communication Interface ("PC5"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Feedback Channel ("PSFCH"), Physical Sidelink Shared Channel ("PSSCH"), Phase Tracking RS ("PTRS" or "PT-RS"), Quasi Co-Located ("QCL"), Quality of Service ("QoS"), Random Access Channel ("RACH"), Radio Access Network ("RAN"), Radio Access Technology ("RAT"), Resource Block ("RB"), Resource Element ("RE"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Sidelink Control Information ("SCI"), Sidelink Control Feedback Information ("SCFI"), Sub Carrier Spacing ("SCS"), Service Data Unit ("SDU"), Synchronized Frequency Network ("SFN"), Subscriber Identity Module ("SIM"), Signal-to-Interference and Noise Ratio ("SINR"), Sidelink ("SL"), Sequence Number ("SN"), Scheduling Request ("SR"), Synchronization Signal ("SS"), SS/PBCH Block ("SSB"), Time Division Duplex ("TDD"), Temporary Mobile Subscriber Identity ("TMSI"), Transmission Reception Point ("TRP"), Transmit ("TX"), Unicast ("UC"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Voice Quality Index ("VQI"), Vehicle RNTI ("V-RNTI"), Worldwide Interoperability for Microwave Access ("WiMAX"), and Zero Power ("ZP"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, feedback may be used to indicate whether information is correctly received. In such networks, feedback may not always be desired because it may use too many resources, may interfere with communications from other devices, and/or may not be useful.

BRIEF SUMMARY

Methods for feedback request determination are disclosed. Apparatuses and systems also perform the functions of the apparatus. In one embodiment, the method includes determining, at a first sidelink device, whether to request feedback corresponding to communications with a second sidelink device. In certain embodiments, the method includes, in response to determining to request feedback corresponding to the communications with the second sidelink device, transmitting first information to the second sidelink device indicating a request for feedback. In various embodiments, the method includes transmitting second information to the second sidelink device indicating resources for communicating the feedback.

An apparatus for feedback request determination, in one embodiment, includes a processor that determines whether to request feedback corresponding to communications with a second sidelink device. In various embodiments, the apparatus includes a transmitter that: in response to determining to request feedback corresponding to the communications with the second sidelink device, transmits first information to the second sidelink device indicating a request for feedback; and transmits second information to the second sidelink device indicating resources for communicating the feedback.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 10 is a schematic block diagram illustrating another embodiment of a PSFCH.

DETAILED DESCRIPTION

Figure 1:
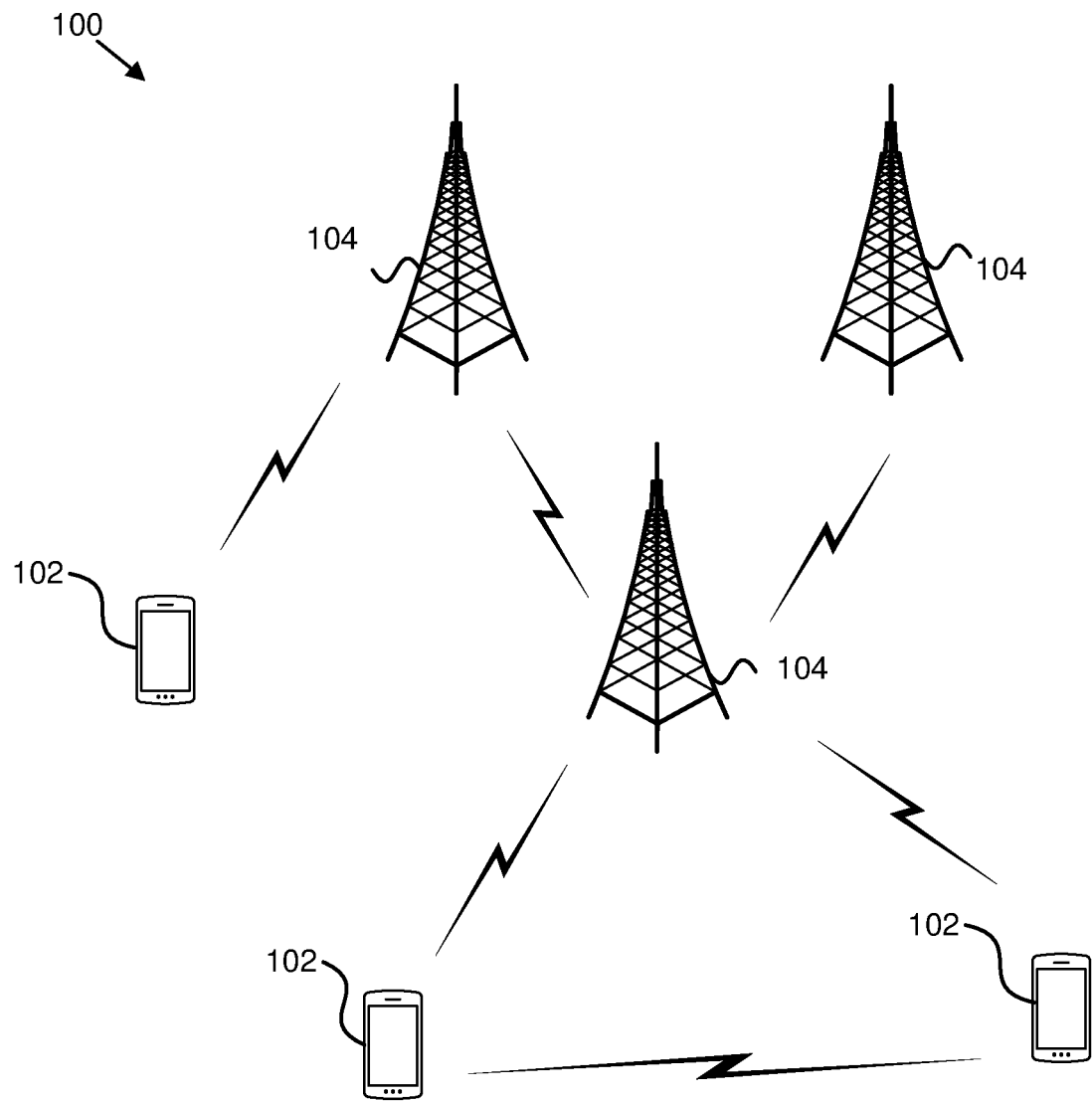
FIG. 1 is a schematic block diagram illustrating one embodiment of a wireless communication system for feedback request determination.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for feedback request determination. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 (e.g., sidelink devices) may communicate directly with other remote units 102 (e.g., sidelink devices) via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 (e.g., sidelink device) may determine whether to request feedback corresponding to communications with a second sidelink device. In certain embodiments, the remote unit 102 may, in response to determining to request feedback corresponding to the communications with the second sidelink device, transmit first information to the second sidelink device indicating a request for feedback. In various embodiments, the remote unit 102 may transmit second information to the second sidelink device indicating resources for communicating the feedback. Accordingly, a remote unit 102 may be used for feedback request determination.

Figure 2:
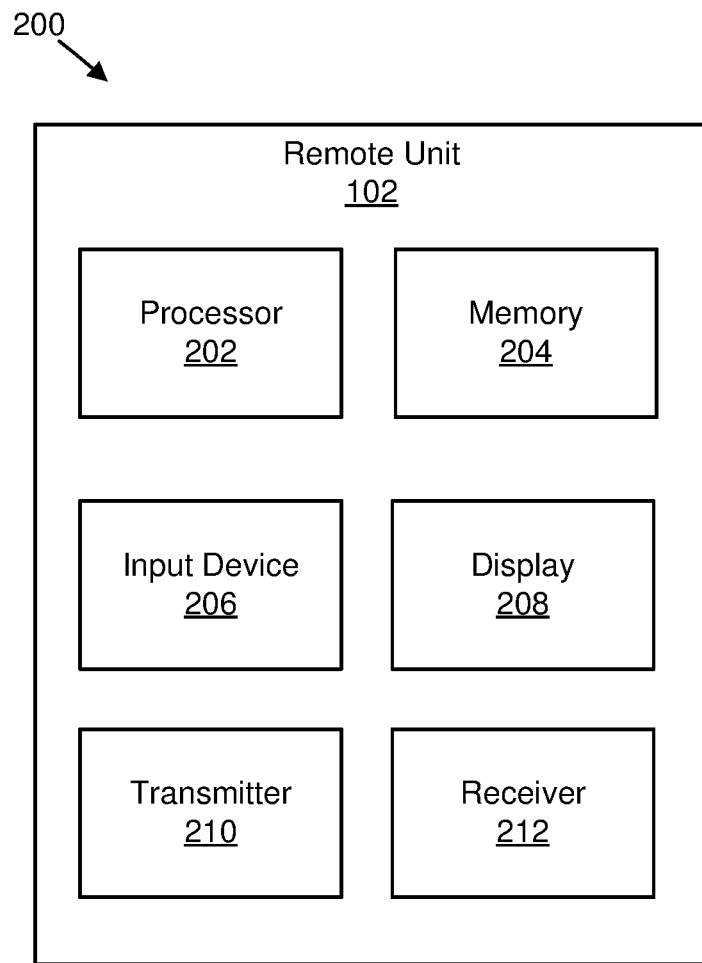
FIG. 2 is a schematic block diagram illustrating one embodiment of an apparatus that may be used for feedback request determination.

FIG. 2 depicts one embodiment of an apparatus 200 that may be used for feedback request determination. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 determines whether to request feedback corresponding to communications with a second sidelink device. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the transmitter 210: in response to determining to request feedback corresponding to communications with a second sidelink device, transmits first information to the second sidelink device indicating a request for feedback; and transmits second information to the second sidelink device indicating resources for communicating the feedback.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
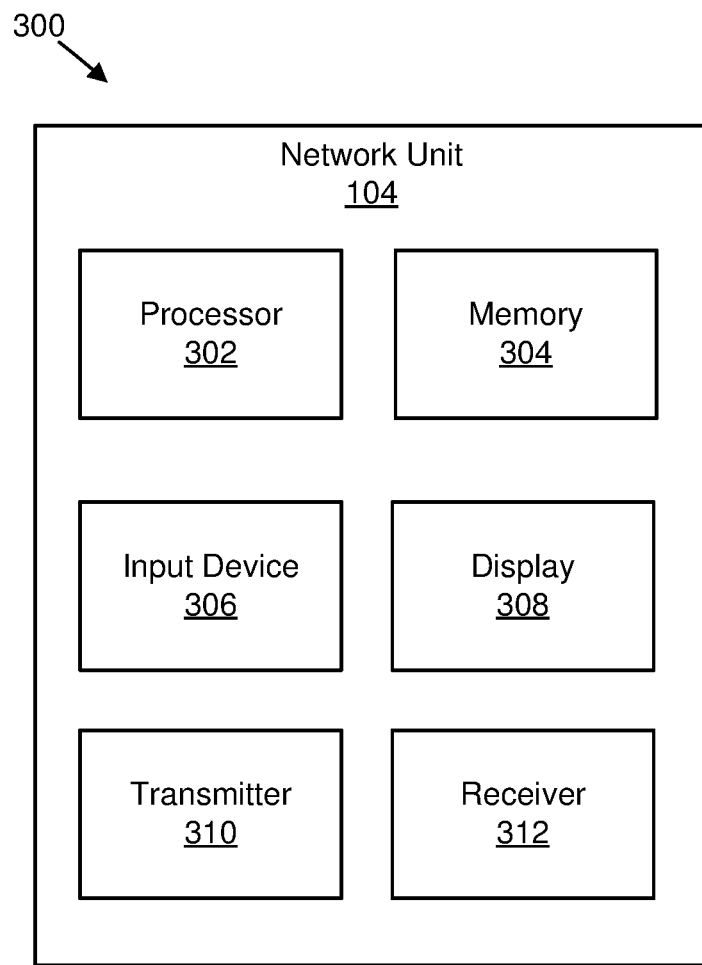
FIG. 3 is a schematic block diagram illustrating another embodiment of an apparatus that may be used for feedback request determination.

FIG. 3 depicts another embodiment of an apparatus 300 that may be used for feedback request determination. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, to increase efficiency in V2X (e.g., sidelink, PC5) communication, HARQ feedback for sidelink transmissions may be used. In certain embodiments, if HARQ feedback is used for GC, a remote unit 102 (e.g., UE, sidelink device) that provides HARQ feedback may only transmit HARQ NACK or may transmit HARQ ACK and NACK.

Figure 4:
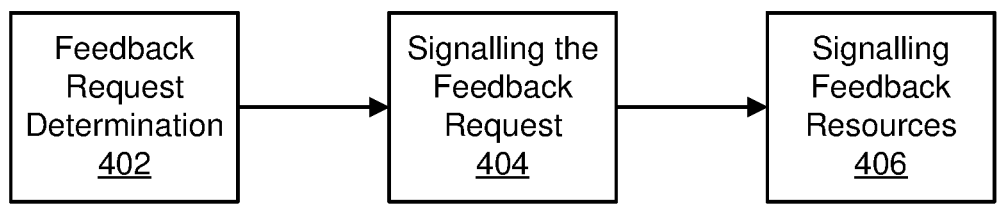
FIG. 4 is a schematic block diagram illustrating one embodiment of a method for feedback request determination.

FIG. 4 is a schematic block diagram illustrating one embodiment of a method 400 for feedback request determination. The method 400 includes a feedback request determination 402, signaling the feedback request 404, and signaling the feedback resources 406. The method 400 may be performed by the remote unit 102 that is used to transmit sidelink information to other sidelink devices. Some embodiments of the feedback request determination 402 are described in relation to FIGS. 5 and 6. Moreover, embodiments of signaling the feedback resources 406 are described in relation to FIGS. 7 and 8.

In various embodiments, the feedback request determination 402 is made first to determine whether one or more receiving sidelink devices are to send HARQ feedback for each data packet transmission (e.g., PSSCH). If no HARQ feedback is used, the remote unit 102 may make a predefined (e.g., preconfigured, predetermined) or a configured (e.g., specified, signaled, or transmitted from a network or by upper layers of the remote unit 102) number of retransmissions of a data packet even though all of the receiving sidelink devices may receive the data packet correctly.

In certain embodiments, signaling the feedback request 404 may include the remote unit 102 (e.g., a physical layer of the remote unit 102) transmitting signaling to a receiving sidelink device indicating whether HARQ feedback is requested for a data transmission explicitly or implicitly.

In one embodiment, the remote unit 102 may transmit explicit signaling to a receiving sidelink device to indicate whether HARQ feedback is requested for a data transmission. The explicit signaling may use one bit in a PSCCH (e.g., SCI). The bit may indicate that HARQ feedback is requested, or that no HARQ feedback is requested. In one example, if the bit is "1" or TRUE, the bit may indicate that HARQ feedback is requested, and if the bit is "0" or FALSE, the bit may indicate that no HARQ feedback is requested. In another example, if the bit is "1" or TRUE, the bit may indicate that no HARQ feedback is requested, and if the bit is "0" or FALSE, the bit may indicate that HARQ feedback is requested.

In certain embodiments, the remote unit 102 may transmit implicit signaling to a receiving sidelink device to indicate whether HARQ feedback is requested for a data transmission. The implicit signaling may use data already transmitted to the receiving sidelink device that indicates whether HARQ feedback is requested. For example, the implicit signaling may include information that is part of a destination ID (in the PSCCH (or SCI)), or an entire destination ID. The destination ID may include one or more bits (e.g., one or more LSBs, one or more MSBs) that indicate a cast-type (e.g., BC, GC, UC). The receiving sidelink device may have a policy that indicates whether HARQ feedback is requested based on the cast-type. The policy may be predefined (e.g., preconfigured, predetermined) at the receiving sidelink device, or may be configured (e.g., specified, signaled, or transmitted) to the receiving sidelink device. In one example, the policy may indicate that HARQ feedback is provided for GC and UC, but not for BC.

Figure 5:
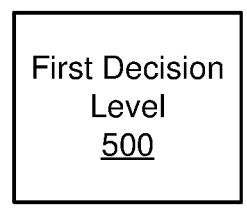
FIG. 5 is a schematic block diagram illustrating one embodiment of a feedback request determination.

FIG. 5 is a schematic block diagram illustrating one embodiment of the feedback request determination 402. The feedback request determination 402 includes (e.g., only includes) a first decision level 500.

In some embodiments, the first decision level 500 includes a policy that is either predefined (e.g., preconfigured, predetermined) or configured (e.g., specified, signaled, or transmitted by a network or by an upper layer of the remote unit 102). In one example, the policy may indicate that HARQ feedback is provided for GC and UC, but not for BC. In this example, a BC packet (e.g., data packet transmitted to a destination group ID corresponding to a BC) may not request any HARQ feedback, but UC or GC transmissions may always request HARQ feedback. In other examples, the policy may use any factor (e.g., cast-type, etc.) for determining whether feedback should be requested.

In certain embodiments, the first decision level 500 may determine whether HARQ feedback is requested based on one or more of the following factors (in one embodiment, these factors may be part of a policy): a number of sidelink devices configured to receive communications from the remote unit 102; a communication range corresponding to the sidelink devices; a latency corresponding to the sidelink devices; and/or a quality of service parameter corresponding to the sidelink devices.

In one embodiment, the first decision level 500 may determine whether HARQ feedback is requested based on the number of sidelink devices configured to receive communications from the remote unit 102. For example, if a number of target sidelink devices (e.g., irrespective of cast-type) is less than a predetermined number "N", then the remote unit 102 may request HARQ feedback. Moreover, if the number of target sidelink devices is greater than or equal to N, then the remote unit 102 may not request HARQ feedback. The number of sidelink devices may be determined by an application level discovery, a physical layer discovery, and/or a sensing procedure. N may also be predefined or configured.

The application level discovery may be performed by an application level (e.g., V2X applications, V2X layer) determining the number of sidelink devices in a group and internally informing an access stratum. The physical layer discovery may be performed by a discovery mechanism at the physical layer sending a request to sidelink devices (e.g., "Who is there?" request).

The sensing procedure may be performed as an extension of a sensing procedure performed by SCI decoding. For example, each sidelink device may share its own geolocation information, relative location information, or some part of geolocation information that identifies either a relative or an absolute position of a UE (e.g., a current zone ID) in its SCI, and the remote unit 102 may decode the sidelink devices SCI as part of a continuous sensing procedure. Moreover, the remote unit 102 may determine a relative distance between the remote unit 102 and the sidelink devices and may determine a number of sidelink devices within a certain vicinity. The remote unit may only include sidelink devices that have a certain level of a QoS parameter (e.g., minimum communication parameter).

In certain embodiments, the first decision level 500 may determine whether HARQ feedback is requested based on a communication range (e.g., a minimum communication range corresponding to a TX power of the remote unit 102) corresponding to the sidelink devices. In such embodiments, a minimum communication range "R" may be provided from an upper layer of the remote unit 102 to a physical layer of the remote unit 102. If the minimum communication range (e.g., for a data transmission) is smaller than R, then the remote unit 102 may request HARQ feedback, and if minimum communication range is larger than or equal to R, then the remote unit 102 may not request HARQ feedback. R may be predefined or configured.

In some embodiments, the first decision level 500 may determine whether HARQ feedback is requested based on a latency corresponding to the sidelink devices. For example, if a required latency for a V2X data packet is less than a certain time "T", then the remote unit 102 may not request HARQ feedback, and if the required latency for the V2X data packet is greater than or equal to T, then the remote unit 102 may request HARQ feedback. T may be predefined or configured. If the remote unit 102 does not request HARQ feedback, the remote unit 102 may make a predetermined number of retransmissions. In certain embodiments, the required latency may be indicated by an upper layer (e.g., derived from PPPP, PPPR, QoS, 5QI, and/or VQI corresponding to a packet, flow, and/or bearer).

In various embodiments, the first decision level 500 may determine whether HARQ feedback is requested based on a quality of service parameter corresponding to the sidelink devices. The QoS parameter may include whether a bearer has a GBR, a reliability, and/or a data rate. Based on the QoS parameter, the remote unit 102 may determine whether HARQ feedback is to be requested. For example, for a GBR bearer, the remote unit 102 may not request HARQ feedback, but instead may perform a predetermined number of retransmissions. In another example, for a low reliability, the remote unit 102 may request HARQ feedback.

In certain embodiments, a cast-type for a data packet may be known by an access stratum (e.g., level 1 layer, level 2 layer, physical layer). In other embodiments, a cast-type for a data packet may not be know by the access stratum. In embodiments in which the cast-type for a data packet is not know by the access stratum, upper layers may indicate the cast-type (e.g., BC, GC, UC) to the access stratum.

In some embodiments, the upper layers may indicate a mapping between each cast-type and each logical channel to the access stratum. In such embodiments, if a data packet arrives at the access stratum from the upper layers for a new QoS flow and/or a new bearer (e.g., unmapped logical channel), the upper layers may indicate to the access stratum (e.g., layer 2, layer 1) which cast-type the new QoS flow and/or the new bearer belongs to. In various embodiments, layer 2 (e.g., MAC layer) may indicate a mapping between each cast-type and each logical channel to layer 1 (e.g., physical layer) as part of interlayer communications. In certain embodiments, a layer 2 (e.g., MAC layer) may include a cast-type in the header of a data packet and the header may be read by a layer 1 (e.g., physical layer).

In one embodiment, a cast-type may be included as part of a destination ID. In such an embodiment, separate destination IDs or destination ID groups may correspond to different cast-types. A mapping between destination IDs and/or destination ID groups and different cast-types may be predefined or configured. In some embodiments, a level 1 layer may determine a cast-type based on at least a part of a destination ID.

Figure 6:
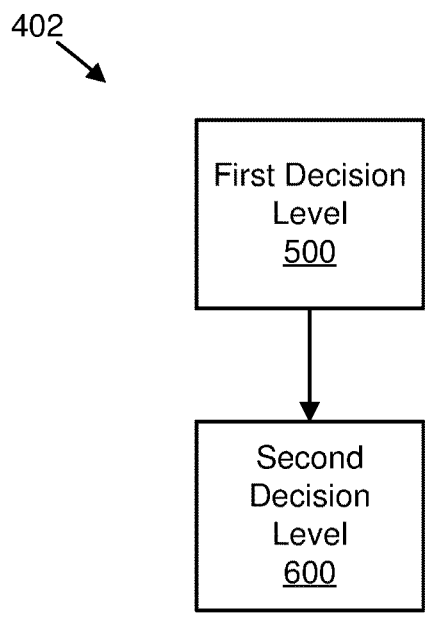
FIG. 6 is a schematic block diagram illustrating another embodiment of a feedback request determination.

FIG. 6 is a schematic block diagram illustrating another embodiment of a feedback request determination 402. The feedback request determination 402 includes the first decision level 500 and a second decision level 600. The first decision level 500 may be substantially similar to the first decision level 500 described in relation to FIG. 5. For example, the first decision level 500 may include a policy.

In some embodiments, the second decision level 600 may include further conditions than the first decision level 500. For example, the first decision level 500 may include a policy that indicates that HARQ feedback is only to be provided for GC and UC, but not for BC. In such an example, the second decision level 600 may indicate if the HARQ feedback is to be requested for all GC transmissions. Furthermore, if the upper layers of the remote unit 102 indicate that a particular GC transmission is addressed to a dynamic group then the access stratum may not request any HARQ feedback, and if the upper layers of the remote unit 102 indicate that a particular GC transmission is addressed to a semi-static or static group then the access stratum may request HARQ feedback. As may be appreciated, the first decision level 500 may be performed before the second decision level 600, or the second decision level 600 may be performed before the first decision level 500. Moreover, while two decision levels are described in relation to this embodiment, there may be three or more decision levels that may or may not depend on one another. Any additional decision levels beyond the first decision level 500 and the second decision level 600 may use any of the decision criteria described in relation to the first decision level 500 and/or the second decision level 600.

Figure 7:
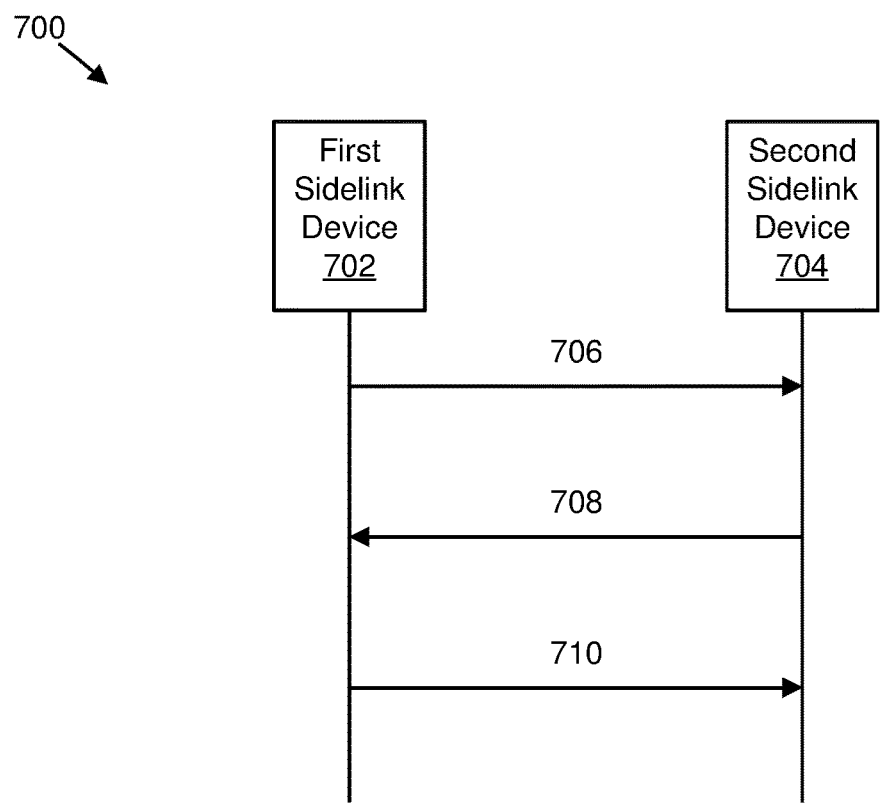
FIG. 7 is a schematic block diagram illustrating one embodiment of communications between sidelink devices.

FIG. 7 is a schematic block diagram illustrating one embodiment of communications 700 between sidelink devices. The communications 700 are used to indicate feedback resources to one or more sidelink devices. The communications 700 are between a first sidelink device 702 (e.g., the remote unit 102, a TX sidelink device) and a second sidelink device 704 (e.g., the remote unit 102, an RX sidelink device).

The communications 700 include a first communication 706, a second communication 708, and a third communication 710. The first communication 706 is transmitted from the first sidelink device 702 to the second sidelink device 704 and includes a query to determine which sidelink devices the first sidelink device 702 can communicate with, such as a "Who is there?" query.

The second communication 708 is transmitted from the second sidelink device 704 (or other sidelink devices) to the first sidelink device 702 and includes a response to the query, such as with an "I am here" indication and/or a UE ID.

The third communication 710 is transmitted from the first sidelink device 702 to the second sidelink device 704 and includes information that explicitly or implicitly indicates feedback resources.

In some embodiments, the first sidelink device 702 determines whether there will be one or more common feedback resources configured for the second sidelink device 704 (and other sidelink devices), or whether there will be one or more UE specific feedback resources assigned to the second sidelink device 704 (or other sidelink devices) for receiving certain data packets. In certain embodiments, one or more common feedback resources may enable a NACK transmission to be received by the first sidelink device 702 in response to the second sidelink device 704 failing to receive a data packet. In various embodiments, one or more UE specific resources may enable ACK/NACK transmission to be received by the first sidelink device 702 in response to the second sidelink device 704 failing to receive a data packet.

Determining whether to use common feedback resources or UE specific resources may be made based on embodiments described in relation to FIGS. 5 and 6.

In some embodiments, if it is determined that common feedback resources are to be provided and the second sidelink device 704 (or other sidelink devices) are within network coverage, a network device (e.g., e.g., network unit 104) may indicate the common feedback resources. The common feedback resources may be derived from a RB index of a PSSCH. In certain embodiments, if it is determined that common feedback resources are to be provided and the second sidelink device 704 (or other sidelink devices) are outside network coverage, the first sidelink device 702 may indicate the common feedback resources at predetermined intervals. The sidelink device 702 may indicate the common feedback resources using an advertisement and/or a GC of the common feedback resources. Moreover, the common feedback resources may be indicated at a beginning of a session (e.g., before transmitting a first PSSCH). In addition, the common feedback resources may be indicated at predetermined intervals, such as from time to time (e.g., as a result of an expiration of a timer) and/or upon a new member (e.g., sidelink device) joining a group. The common feedback resources may be preconfigured (e.g., predetermined) for each group destination ID, derived from SCI (e.g., from a particular (e.g., lowest, highest) RB index of a PSSCH), and/or derived from common group resources (e.g., could be some resources common to more than one group, but an individual group may scramble a feedback transmission using at least part of a group destination ID or the entire group destination ID).

The third communication 710 may be used to provide UE specific feedback resources using explicit and/or implicit methods.

In one embodiment, the first sidelink device 702 explicitly provides UE specific resources directly to each sidelink device as part of the third communication 710, such as by using UC signaling.

In certain embodiments, the first sidelink device 702 advertises and/or GCs UE specific resources in a data set (e.g., table) to all sidelink devices. In such embodiments, the first sidelink device 702 may provide the data set at a beginning of a session (e.g., before transmitting a first PSSCH) and/or at predetermined intervals. The predetermined intervals may be from time to time (e.g., as a result of an expiration of a timer) and/or upon a new member (e.g., sidelink device) joining a group. One example of a table is illustrated in Table 1.

TABLE 1

| UE_ID_1 | HARQ Feedback Resource_1 |
|---------|--------------------------|
| UE_ID_2 | HARQ Feedback Resource_2 |
| ...     | ...                      |
| UE_ID_N | HARQ Feedback Resource_N |

Within a network, the UE_ID may be a network assigned identity (e.g., a C-RNTI for an RRC connected UE) or a part of the network assigned identity. Outside of the network, the UE_ID may be randomly chosen by the remote unit 102 (e.g., an 8 or 16 bit randomly chosen ID) or preconfigured by higher layers of the remote unit 102.

In various embodiments, the first sidelink device 702 provides the second sidelink device 704 (and other sidelink devices) with a group internal ID as part of the third communication 710. The group internal ID may correspond with an index for a set of HARQ feedback resources transmitted to an entire set of sidelink devices. Thus, the second sidelink device 704 (and other sidelink devices) will know which index number in the set of HARQ feedback resources corresponds to the second sidelink device 704. One example of this is illustrated in FIG. 8.

Figure 8:
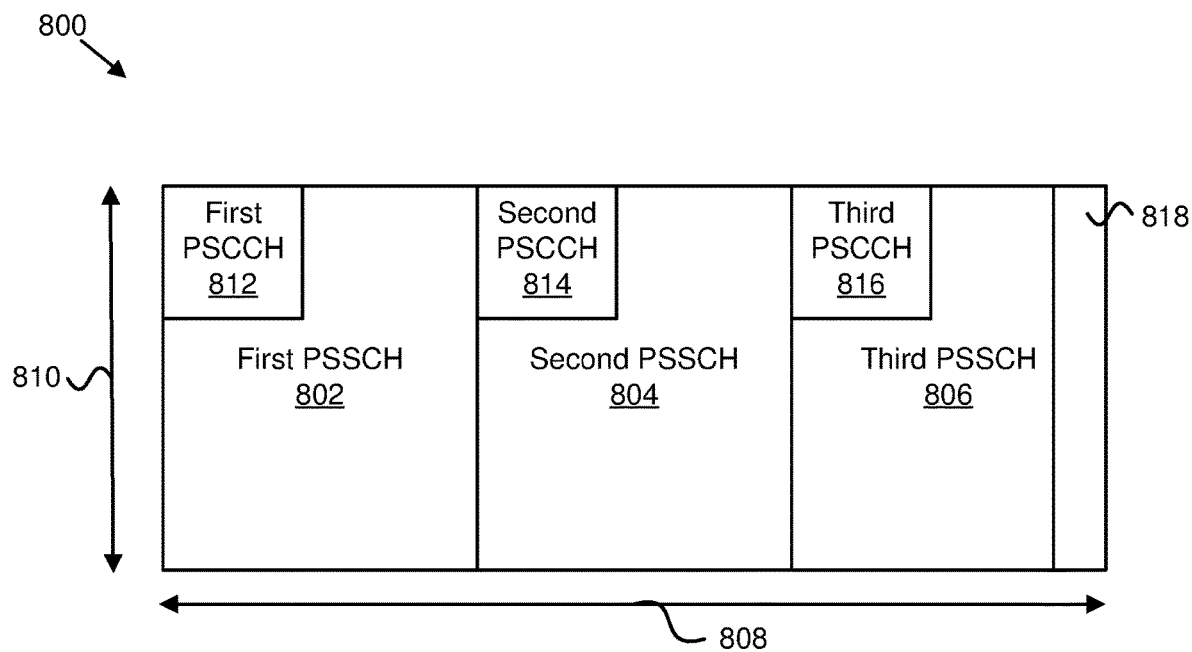
FIG. 8 is a schematic block diagram illustrating one embodiment of PSSCH communications.

FIG. 8 is a schematic block diagram illustrating one embodiment of PSSCH communications 800. The PSSCH communications 800 include a first PSSCH 802 transmitted over a first time period, a second PSSCH 804 transmitted over a second time period, and a third PSSCH 806 transmitted over a third time period. The first time period, the second time period, and the third time period extend over a time 808. Moreover, the first PSSCH 802, the second PSSCH 804, and the third PSSCH 806 are transmitted over a frequency range 810.

A first PSCCH 812 is transmitted at the beginning of the first PSSCH 802 (for which it is associated), a second PSCCH 814 is transmitted at the beginning of the second PSSCH 804 (for which it is associated), and a third PSCCH 816 is transmitted at the beginning of the third PSSCH 806 (for which it is associated). The first PSCCH 812 indicates the first PSSCH 802 and feedback corresponding to the first PSSCH 802 that is transmitted in PSFCH 818 (e.g., SCFI, ACK/NACK) which as an n+2 timeslot in relation to the first PSSCH 802. In one embodiment, the PSFCH 818 includes one feedback symbol and/or one RB for each HARQ feedback.

Figure 9:
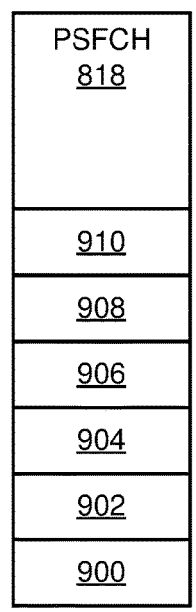
FIG. 9 is a schematic block diagram illustrating one embodiment of a PSFCH.

FIG. 9 is a schematic block diagram illustrating one embodiment of the PSFCH 818. The PSFCH 818 includes first feedback 900 (e.g., SFCI for group internal ID 1), second feedback 902 (e.g., SFCI for group internal ID 2), third feedback 904 (e.g., SFCI for group internal ID 3), fourth feedback 906 (e.g., SFCI for group internal ID 4), fifth feedback 908 (e.g., SFCI for group internal ID 5), and sixth feedback 910 (e.g., SFCI for group internal ID 6).

The frequency location of each SFCI on PSFCH 818 may be based on a frequency location of scheduled PSSCH (as shown in FIG. 9) or may be based on a frequency location of PSCCH. For example, the group internal ID (which is different from a destination ID or a group destination ID) of a first UE may be 0001, so its frequency location of SFCI may be the same as a lowest frequency index of scheduled PSSCH frequency resource, the group internal ID of a second UE may be 0010, so its frequency location of SFCI may be the second lowest frequency index of scheduled PSSCH frequency resource, and so on. In one embodiment, if a maximum number in a group is 16, the length of group internal ID may be 4 bits. In some embodiments, an interleaving rule may be used for determining the feedback resource location.

Figure 10:
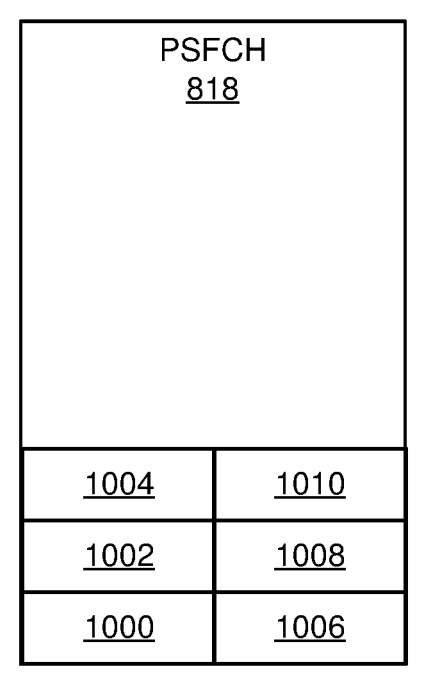

In certain embodiments, the resources of SFCI on PSFCH may be allocated in different time domain symbols or a combination of frequency location and time domain symbols as illustrated in FIG. 10. A set of SFCI allocated on a frequency location in one or more time domain symbols for one set of UEs and another set of SFCI allocated on a frequency location in other time domain symbols for another set of UEs. With such embodiments, other than a TX UE, all other UEs or a subset of UEs may monitor the feedback without a half duplex constraint and may retransmit the PSSCH.

In some embodiments, retransmission of PSSCH may occur based on a SFN from a subset of UEs. The SFN may use identical attributes for a transmission configuration from the subset of UEs. The identical attributes may be common reference timing information that may include time slot and/or symbol information used for transmission, with identical content transmitted. Moreover, a RX UE may receive multiple copies of the same signal from different transmitters (e.g., that are time synchronized) resulting in an amplitude of the signal received having a higher signal power thereby increasing reliability of decoding a data packet carried by the signal.

In various embodiments, a TX UE may indicate a grant with a redundancy version for a SFN type of retransmission from a subset of UEs together with the TX UE's initial GC transmission grant.

FIG. 10 is a schematic block diagram illustrating another embodiment of the PSFCH 818. The PSFCH 818 includes first feedback 1000 (e.g., SFCI for group internal ID 1), second feedback 1002 (e.g., SFCI for group internal ID 2), third feedback 1004 (e.g., SFCI for group internal ID 3), fourth feedback 1006 (e.g., SFCI for group internal ID 4), fifth feedback 1008 (e.g., SFCI for group internal ID 5), and sixth feedback 1010 (e.g., SFCI for group internal ID 6). The first feedback 1000, the second feedback 1002, and the third feedback 1004 are each transmitted in first time domain symbols, but different frequency locations. Moreover, the fourth feedback 1006, the fifth feedback 1008, and the sixth feedback 1010 are each transmitted in second time domain symbols, but different frequency locations.

In some embodiments, a new incoming sidelink device may decode the PSCCH (e.g., SCI) and check if a destination ID (e.g., group destination ID) contained in the PSCCH is one of the groups or destinations that the sidelink device is a part of or is interested in (e.g., it may have been configured and/or preconfigured with the destination ID or group destination ID). If the new incoming sidelink devices determines that the PSCCH includes a destination ID corresponding to the sidelink device, then the sidelink device may transmit the second communication 708 previously described, and the second communication 708 may include a UE_ID corresponding to the sidelink device.

In certain embodiments, control signaling from the remote unit 102 indicates if no feedback is requested, if all receiving sidelink devices are expected to send feedback (e.g., a common feedback resource embodiment), or if only specific sidelink devices are expected to transmit HARQ feedback (e.g., a UE specific feedback resource embodiment that may be implemented by including two bits in the SCI (e.g., within the PSCCH).

Figure 11:
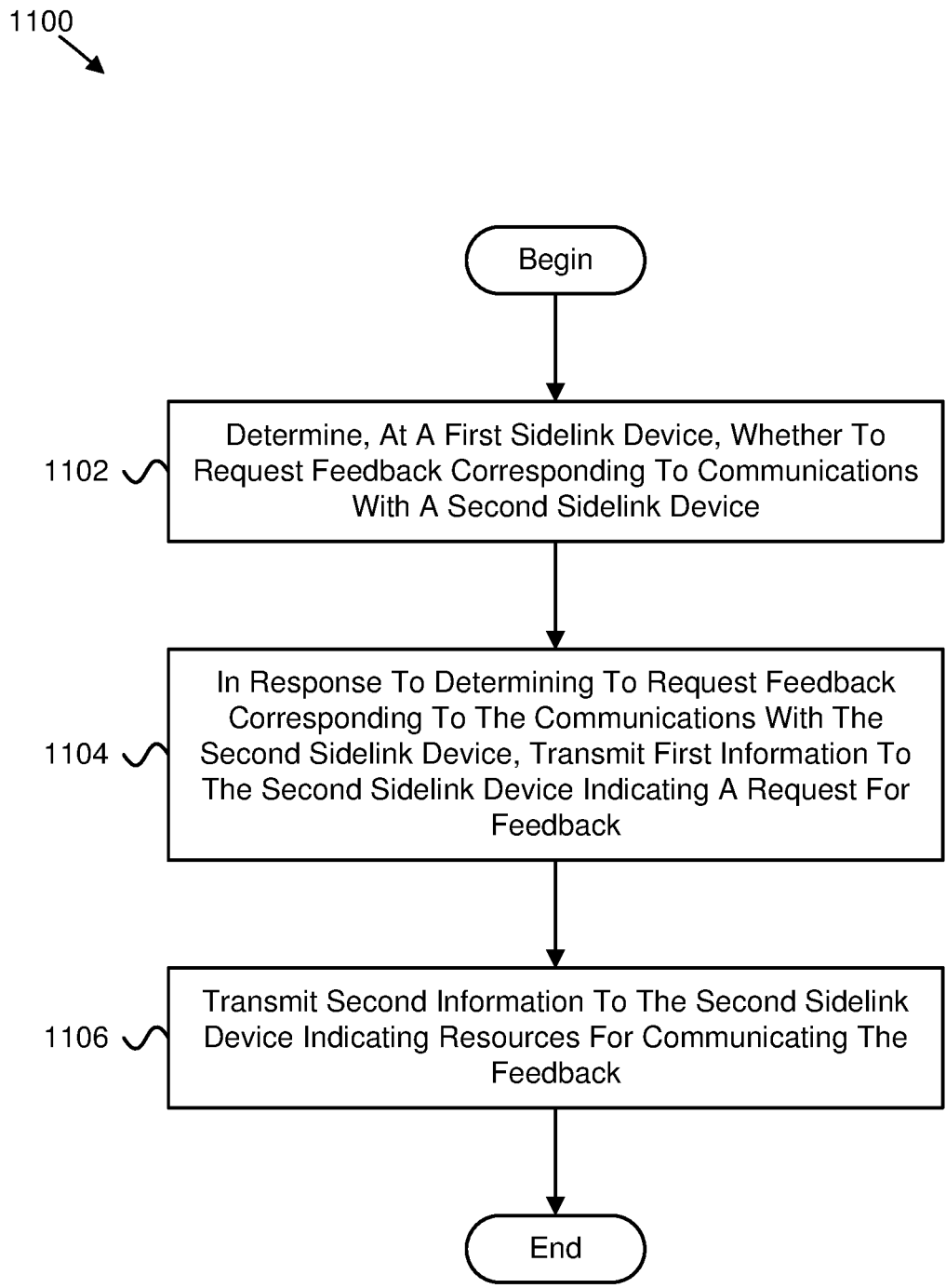
FIG. 11 is a schematic flow chart diagram illustrating one embodiment of a method for feedback request determination.

FIG. 11 is a schematic flow chart diagram illustrating one embodiment of a method 1100 for feedback request determination. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include determining 1102, at a first sidelink device, whether to request feedback corresponding to communications with a second sidelink device. In certain embodiments, the method 1100 includes, in response to determining to request feedback corresponding to the communications with the second sidelink device, transmitting 1104 first information to the second sidelink device indicating a request for feedback. In various embodiments, the method 1100 includes transmitting 1106 second information to the second sidelink device indicating resources for communicating the feedback.

In certain embodiments, determining 1102 whether to request feedback corresponding to the communications with the second sidelink device comprises determining whether to request feedback based on a policy. In some embodiments, the policy is predetermined, configured by a network, configured by an upper layer, or some combination thereof. In various embodiments, the policy indicates whether to request feedback for groupcast, unicast, broadcast, or some combination thereof.

In one embodiment, determining 1102 whether to request feedback corresponding to the communications with the second sidelink device comprises determining whether to request feedback based on the policy and a predetermined condition. In certain embodiments, the predetermined condition comprises third information that indicates whether a group is static, dynamic, semi-static, or some combination thereof. In some embodiments, determining 1102 whether to request feedback corresponding to the communications with the second sidelink device comprises determining whether to request feedback based on: a number of sidelink devices configured to receive communications from the first sidelink device; a communication range corresponding to the sidelink devices; a latency corresponding to the sidelink devices; a quality of service parameter corresponding to the sidelink devices; or some combination thereof.

In various embodiments, the method 1100 further comprises determining the number of sidelink devices based on an application layer discovery, a physical layer discovery, a sensing procedure, or some combination thereof. In one embodiment, determining 1102 whether to request feedback corresponding to the communications with the second sidelink device comprises determining whether to request feedback based on a policy, a predetermined condition, or a combination thereof. In certain embodiments, the method 1100 further comprises transmitting third information from an upper layer of the first sidelink device to an access stratum of the first sidelink device, wherein the third information indicates a cast-type corresponding to a packet.

In some embodiments, the cast-type comprises groupcast, broadcast, or unicast transmission. In various embodiments, the cast-type is indicated based on a first mapping between the cast type and each logical channel of the first sidelink device. In one embodiment, the cast-type is indicated as part of a destination identifier transmitted to the access stratum.

In certain embodiments, the access stratum comprises a physical layer, a layer 1, a layer 2, or a combination thereof. In some embodiments, the first information comprises a bit in sidelink control information that indicates the request for feedback. In various embodiments, the first information comprises at least a portion of a destination identifier, and the at least a portion of the destination identifier is used by the second sidelink device to determine the request for feedback.

In one embodiment, the resources for communicating the feedback comprise common resources, device specific resources, or a combination thereof. In certain embodiments, the common resources are predetermined for each group destination identifier of a plurality of group destination identifiers, derived from sidelink control information, derived from common group resources, or some combination thereof. In some embodiments, in response to the resources for communicating the feedback comprising common resources and the second sidelink device being within network coverage, a network device indicates the common resources. In certain embodiments, a PSFCH carrying the common resources may be scrambled with a group destination identifier.

In various embodiments, in response to the resources for communicating the feedback comprising common resources and the second sidelink device being outside network coverage, the first sidelink device indicates the common resources at predetermined intervals. In one embodiment, each predetermined interval of the predetermined intervals occurs as a result of an expiration of a timer, a new sidelink device joining a group, or a combination thereof. In certain embodiments, the second information comprises an explicit indication of the resources for communicating the feedback from the second sidelink device.

In some embodiments, the second information comprises a mapping between an identifier corresponding to the second sidelink device and the resources for communicating the feedback. In various embodiments, the second information comprises an index corresponding to the second sidelink device. In one embodiment, the method 1100 further comprises transmitting third information comprising a mapping between the index and the resources for communicating the feedback.

In certain embodiments, the first information indicates that no feedback is requested, the feedback is requested for each sidelink device of a plurality of sidelink devices, the feedback is requested for one or more sidelink devices of the plurality of sidelink devices, or some combination thereof.

In one embodiment, a method comprises: determining, at a first sidelink device, whether to request feedback corresponding to communications with a second sidelink device; in response to determining to request feedback corresponding to the communications with the second sidelink device, transmitting first information to the second sidelink device indicating a request for feedback; and transmitting second information to the second sidelink device indicating resources for communicating the feedback.

In certain embodiments, determining whether to request feedback corresponding to the communications with the second sidelink device comprises determining whether to request feedback based on a policy.

In some embodiments, the policy is predetermined, configured by a network, configured by an upper layer, or some combination thereof.

In various embodiments, the policy indicates whether to request feedback for groupcast, unicast, broadcast, or some combination thereof.

In one embodiment, determining whether to request feedback corresponding to the communications with the second sidelink device comprises determining whether to request feedback based on the policy and a predetermined condition.

In certain embodiments, the predetermined condition comprises third information that indicates whether a group is static, dynamic, semi-static, or some combination thereof.

In some embodiments, determining whether to request feedback corresponding to the communications with the second sidelink device comprises determining whether to request feedback based on: a number of sidelink devices configured to receive communications from the first sidelink device; a communication range corresponding to the sidelink devices; a latency corresponding to the sidelink devices; a quality of service parameter corresponding to the sidelink devices; or some combination thereof.

In various embodiments, the method further comprises determining the number of sidelink devices based on an application layer discovery, a physical layer discovery, a sensing procedure, or some combination thereof.

In one embodiment, determining whether to request feedback corresponding to the communications with the second sidelink device comprises determining whether to request feedback based on a policy, a predetermined condition, or a combination thereof.

In certain embodiments, the method further comprises transmitting third information from an upper layer of the first sidelink device to an access stratum of the first sidelink device, wherein the third information indicates a cast-type corresponding to a packet.

In some embodiments, the cast-type comprises groupcast, broadcast, or unicast transmission.

In various embodiments, the cast-type is indicated based on a first mapping between the cast type and each logical channel of the first sidelink device.

In one embodiment, the cast-type is indicated as part of a destination identifier transmitted to the access stratum.

In certain embodiments, the access stratum comprises a physical layer, a layer 1, a layer 2, or a combination thereof.

In some embodiments, the first information comprises a bit in sidelink control information that indicates the request for feedback.

In various embodiments, the first information comprises at least a portion of a destination identifier, and the at least a portion of the destination identifier is used by the second sidelink device to determine the request for feedback.

In one embodiment, the resources for communicating the feedback comprise common resources, device specific resources, or a combination thereof.

In certain embodiments, the common resources are predetermined for each group destination identifier of a plurality of group destination identifiers, derived from sidelink control information, derived from common group resources, or some combination thereof.

In some embodiments, in response to the resources for communicating the feedback comprising common resources and the second sidelink device being within network coverage, a network device indicates the common resources.

In various embodiments, in response to the resources for communicating the feedback comprising common resources and the second sidelink device being outside network coverage, the first sidelink device indicates the common resources at predetermined intervals.

In one embodiment, each predetermined interval of the predetermined intervals occurs as a result of an expiration of a timer, a new sidelink device joining a group, or a combination thereof.

In certain embodiments, the second information comprises an explicit indication of the resources for communicating the feedback from the second sidelink device.

In some embodiments, the second information comprises a mapping between an identifier corresponding to the second sidelink device and the resources for communicating the feedback.

In various embodiments, the second information comprises an index corresponding to the second sidelink device.

In one embodiment, the method further comprises transmitting third information comprising a mapping between the index and the resources for communicating the feedback.

In certain embodiments, the first information indicates that no feedback is requested, the feedback is requested for each sidelink device of a plurality of sidelink devices, the feedback is requested for one or more sidelink devices of the plurality of sidelink devices, or some combination thereof.

In one embodiment, an apparatus comprises: a processor that determines whether to request feedback corresponding to communications with a second sidelink device; and a transmitter that: in response to determining to request feedback corresponding to the communications with the second sidelink device, transmits first information to the second sidelink device indicating a request for feedback; and transmits second information to the second sidelink device indicating resources for communicating the feedback.

In certain embodiments, the processor determines whether to request feedback corresponding to the communications with the second sidelink device by the processor determining whether to request feedback based on a policy.

In some embodiments, the policy is predetermined, configured by a network, configured by an upper layer, or some combination thereof.

In various embodiments, the policy indicates whether to request feedback for groupcast, unicast, broadcast, or some combination thereof.

In one embodiment, the processor determines whether to request feedback corresponding to the communications with the second sidelink device by the processor determining whether to request feedback based on the policy and a predetermined condition.

In certain embodiments, the predetermined condition comprises third information that indicates whether a group is static, dynamic, semi-static, or some combination thereof.

In some embodiments, the processor determines whether to request feedback corresponding to the communications with the second sidelink device by the processor determining whether to request feedback based on: a number of sidelink devices configured to receive communications from the apparatus; a communication range corresponding to the sidelink devices; a latency corresponding to the sidelink devices; a quality of service parameter corresponding to the sidelink devices; or some combination thereof.

In various embodiments, the processor determines the number of sidelink devices based on an application layer discovery, a physical layer discovery, a sensing procedure, or some combination thereof.

In one embodiment, the processor determines whether to request feedback corresponding to the communications with the second sidelink device by the processor determining whether to request feedback based on a policy, a predetermined condition, or a combination thereof.

In certain embodiments, the transmitter transmits third information from an upper layer of the apparatus to an access stratum of the apparatus, and the third information indicates a cast-type corresponding to a packet.

In some embodiments, the cast-type comprises groupcast, broadcast, or unicast transmission.

In various embodiments, the cast-type is indicated based on a first mapping between the cast type and each logical channel of the apparatus.

In one embodiment, the cast-type is indicated as part of a destination identifier transmitted to the access stratum.

In certain embodiments, the access stratum comprises a physical layer, a layer 1, a layer 2, or a combination thereof.

In some embodiments, the first information comprises a bit in sidelink control information that indicates the request for feedback.

In various embodiments, the first information comprises at least a portion of a destination identifier, and the at least a portion of the destination identifier is used by the second sidelink device to determine the request for feedback.

In one embodiment, the resources for communicating the feedback comprise common resources, device specific resources, or a combination thereof.

In certain embodiments, the common resources are predetermined for each group destination identifier of a plurality of group destination identifiers, derived from sidelink control information, derived from common group resources, or some combination thereof.

In some embodiments, in response to the resources for communicating the feedback comprising common resources and the second sidelink device being within network coverage, a network device indicates the common resources.

In various embodiments, in response to the resources for communicating the feedback comprising common resources and the second sidelink device being outside network coverage, the apparatus indicates the common resources at predetermined intervals.

In one embodiment, each predetermined interval of the predetermined intervals occurs as a result of an expiration of a timer, a new sidelink device joining a group, or a combination thereof.

In certain embodiments, the second information comprises an explicit indication of the resources for communicating the feedback from the second sidelink device.

In some embodiments, the second information comprises a mapping between an identifier corresponding to the second sidelink device and the resources for communicating the feedback.

In various embodiments, the second information comprises an index corresponding to the second sidelink device.

In one embodiment, the transmitter transmits third information comprising a mapping between the index and the resources for communicating the feedback.

In certain embodiments, the first information indicates that no feedback is requested, the feedback is requested for each sidelink device of a plurality of sidelink devices, the feedback is requested for one or more sidelink devices of the plurality of sidelink devices, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of sidelink communication performed by a user equipment (UE), the method comprising:
   determining whether to request feedback associated with the sidelink communication based on:
   a first decision level comprising a set of one or more conditions; and
   a second decision level comprising at least one condition different than the set of one or more conditions; and
   transmitting a sidelink message indicating a request for feedback information associated with the sidelink communication based at least in part on the determining.

2. The method of claim 1, further comprising:
   determining whether to request feedback associated with the sidelink communication based on a configuration.

3. The method of claim 2, wherein the sidelink message indicates a cast type, the cast type comprising a groupcast, a unicast, a broadcast, or a combination thereof.

4. The method of claim 3, wherein the cast type is indicated based on a mapping between a respective cast type and a respective logical channel of the UE.

5. The method of claim 1, wherein the feedback is based on a number of UEs.

6. The method of claim 5, wherein the number of UEs is provided by one or more upper layers.

7. The method of claim 1, further comprising determining to request feedback associated with the sidelink communication based on a policy, the set of one or more conditions, the at least one condition, or a combination thereof.

8. The method of claim 1, wherein the sidelink message comprises a bit in sidelink control information that indicates the request for the feedback information.

9. The method of claim 1, wherein one or more resources for the feedback information comprises one or more common resources, one or more UE-specific resources, or a combination thereof.

10. The method of claim 9, wherein the one or more common resources are predetermined for each group destination of a plurality of group destinations, derived from sidelink control information including one or more of a slot for physical sidelink feedback channel (PSFCH) transmission and a frequency location of scheduled physical sidelink shared channel (PSSCH) resources, or a combination thereof.

11. The method of claim 9, wherein, in response to the one or more resources for the feedback information comprising common resources and a second UE in sidelink communication with the UE being within a network coverage, a network device indicates one or more common time and frequency resources.

12. The method of claim 1, wherein the sidelink message indicates that the feedback is requested for each UE of a plurality of UEs.

13. A user equipment (UE) for sidelink communication, comprising:

at least one memory; and at least one processor coupled with the at least one memory and configured to cause the UE to:
  determine whether to request feedback associated with the sidelink communication based on:
    a first decision level comprising a set of one or more conditions; and
    a second decision level comprising at least one condition different than the set of one or more conditions; and
  transmit a sidelink message indicating a request for feedback information associated with the sidelink communication based at least in part on the determining.

14. The UE of claim 13, wherein the at least one processor is configured to cause the UE to determine whether to request feedback associated with the sidelink communication based on a configuration.

15. The UE of claim 14, wherein the sidelink message indicates a cast type, the cast type comprising a groupcast, a unicast, a broadcast, or a combination thereof.

16. The UE of claim 13, wherein the feedback is based on a number of UEs.

17. The UE of claim 16, wherein the number of UEs is provided by upper layers.

* * * * *